Figure 1:
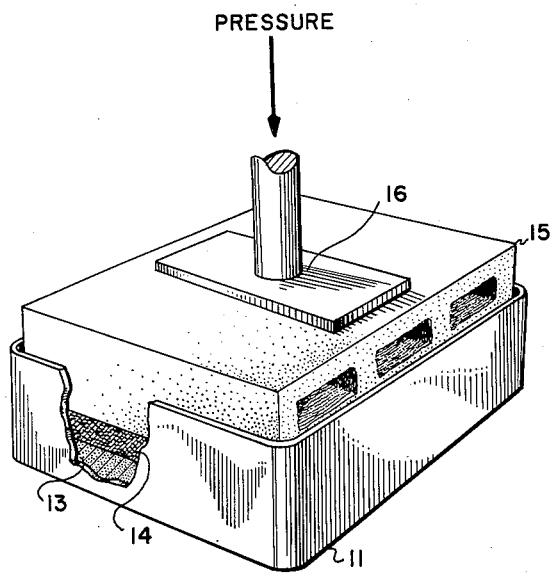
Figure 2:
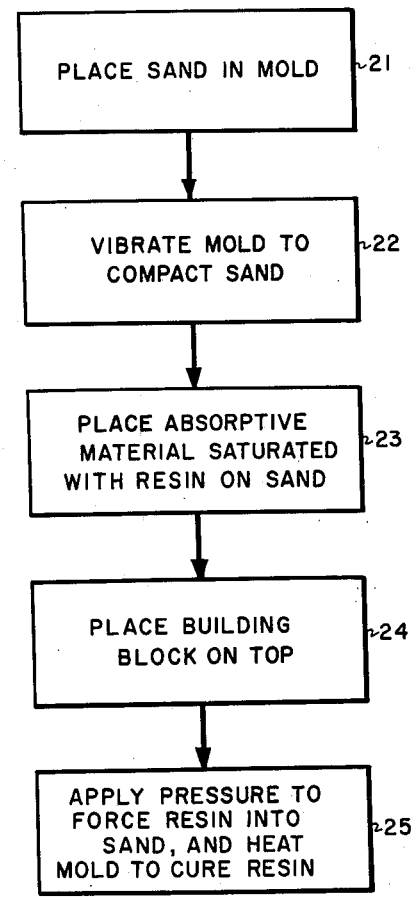

Feb. 20, 1962     I. BENTOV     3,021,573
PROCESS OF MAKING SURFACE COATS
FOR MASONRY BUILDING UNITS
Filed Nov. 5, 1958

United States Patent Office 3,021,573
Patented Feb. 20, 1962

3,021,573
PROCESS OF MAKING SURFACE COATS FOR MASONRY BUILDING UNITS
Itzhak Bentov, Cambridge, Mass., assignor to W. R. Grace & Co., Cambridge, Mass., a corporation of Connecticut
Filed Nov. 5, 1958, Ser. No. 771,943
1 Claim. (Cl. 18—60)

This invention relates to surface coatings for masonry building units. More particularly this invention relates to an improved process of making surface coatings for masonry buildings units.

It is a conventional technique in construction to coat the exposed areas of a final structure to produce an aesthetic or decorative effect thereon. A comparatively recent innovation in construction techniques has been the utilization of individual building units which have had one or more of their surfaces coated prior to the erection of the structure in which they are used. Most generally these individual units are face coated by conventional mold processes at the factory where the individual building units are fabricated.

One adaptation of a conventional mold process which is commercially utilized in summation comprises charging a pre-mixed surface coating composition into a suitable mold, surmounting this fluid composition with a masonry unit and in situ curing the composition. Another adaptation which is commercially utilized is a process in which a suitable form is placed around the boundaries of the masonry block face which is to be coated, a premixed surface coating composition is charged into the formed area upon the masonry face, and the composition is cured in situ forming an integrally surface coat on the block's face.

Many of the pre-mixed coating compositions which have been found to produce highly decorative surfaces by these conventional mold processes are fluidized compositions including among other components a curable resinous material and ordinary sand extenders. The sand in these compositions not only functions as an extender but within specific quantity limits it is known to impart many desirable properties to the final coated surface such as enhanced hardness. In these type processes the resin not only functions as a binder to hold the sand particles together but it also functions as a fluidized carrier which will facilitate the flow of the sand particles during the mold charging stage of the process.

Generally in many mold processes of these types, as is illustrated by both of the aforementioned processes, the flow properties of the pre-mixed coating composition are highly important, and the amount of fluidized resinous carrier required to produce a suitable flow in these type compositions is comparatively high due to the fact that a substantial degree of fluidity must be imparted not only to the resinous component but also to the bulk of sand which is present. It may be further stated that the composition must have a viscosity and consistency that will not only enable it to be used in the conventional mold charging equipment but also these properties are needed to allow the fluidized composition to take on a level form in the mold. In order to obtain the desired flow properties which are essential to these processes it is generally necessary to disperse the sand component somewhat uniformly throughout the fluid resinous composition. It has been found that the more homogeneous the pre-mixed fluidized resinous coating composition, the more uniform the body of the surface coat produced by these processes.

Although the surface coats produced by these processes are highly acceptable aestheticwise and although they contain sand in the formulation of their composition, they do not exhibit the degree of wearability, durability, surface hardness, nor abrasion resistance which is desirable in these type surfaces. It has been found that the aforesaid characteristics are not only effected by the amount of sand which is present in the pre-mixed composition but also these surface characteristics are highly influenced by the position of the sand in the solidified matrix which makes up the final surface coat. It has also been found that maximum enhancement of these desirable surface characteristics may be obtained if a larger proportion of sand is distributed along the wearing surfaces of the coat rather than somewhat uniformly throughout the entire coat as is required by many of the conventional molding processes.

We have discovered a process by which surface coatings are produced which may not only possess a highly acceptable decorative finish but which also possess a greater of wearability during a normal life span, an enhanced hardness, a superior abrasion resistance, and a comparatively higher surface durability than many of the masonry surface coatings heretofore commercially produced. The present process is not only adaptable to the separate and distinct production of surface coatings in the form of caps which may later be adhered to the desired face of a masonry block unit, but it is also adaptable to the direct surface coating of a building unit.

It has been found that not only may we produce a surface coating cap whose strength is relatively enhanced due to the addition of an integral backing support, but also in a typical variation of the present process we may produce a relatively strong surface coating cap without the utilization of a backing support. Further it may be stated that the surface coating cap product of this process may be adhered to a face of a masonry building unit whenever it is desired. For example, this cap may be applied either at the block fabricating plant, or on the construction site prior to erection, or even after erection of the final structure.

In general the process of the present invention comprises depositing a desired amount of sand in a suitable forming vessel, increasing the density of the sand mass in said vessel, substantially impregnating the interstices of the formed sand mass with a fluid coating composition and curing the fluid composition in situ thereby forming a surface coating cap which may be adhered to a masonry block unit.

The drawings illustrate the process of this invention. In the drawings, FIGURE I is a partial cross-sectional view of an assembled mold and illustrates the arrangement of the various components just prior to the applying of pressure to the mold and the heat curing of the resin. FIGURE II schematically illustrates the present process.

More particularly, with reference to FIGURES I and II, the process of the present invention comprises metering between about 30 grams and about 45 grams of sand 13 in step 21 into a suitably sized forming vessel 11, for example a 4" x 8" x ½" mold. The mold is vibrated in step 22 so that the sand will not only take on the shape of the mold and become level therein, but will also compact into a smaller area producing a denser mass. In step 23 a 4" x 8" non-woven cotton web fabric 14 which has been saturated with a fluid resinous coating composition is surmounted upon the upper surface of the sand mass. The viscosity of the fluid composition is between about 60 and about 2000 centipoise and the positioning of the web is such that it overlaps the upper surface area of the shaped sand mass. An insert form or building block 15, of slightly less dimensions of width and length as compared to the mold, is surmounted upon the saturated web contained in the mold in step 24. After the insert form is mounted in position, a relatively flat surfaced ram 16 is placed upon the upper surface of the surmounted form in step 25 and a downward force of between about 8,000 pounds and about 10,000 pounds is applied to the ram for a period of between about 5 minutes and about 15 minutes, with the result that a substantial quantity of the resinous fluid contained in the web will be forced to penetrate the interstices of the shaped sand mass. Simultaneously with the pressure impregnation stage, the temperature of the system is raised to between about 200° F. and about 280° F. and is maintained at this temperature for a period of between about 5 minutes and about 10 minutes to substantially transform the fluid composition into a solidified mass. At this point in the process the temperature of the system is allowed to return to normal and the solidified mass which composes the final surface coat is removed from the mold.

There are a number of forming vessels which may be utilized in the present process, for instance, the conventional molds of the chromium steel type, the polished aluminum type and the stainless steel type. In general, it may be stated that although the aforesaid molds may be utilized as such it is preferential that the forming surfaces of such molds are lined with either a tetrafluoroethylene polymer, aluminum foil or a waxed coating to facilitate the proper release of the shaped articles from such molds after the final stage of the present process.

The amount of sand that is metered into the aforesaid molds depends primarily upon the size and shape of the mold, which in turn is determined by the final physical shape and size which is desired in the final article. By metering the sand into the mold as a separate step, rather than incorporating it as a direct component of the coating composition which is charged into the molds, we insure that the greatest amount of sand will be distributed in proximity to the wearing surface of the final product.

Also it is known that one of the functions of sand in coating compositions is that of an economical extender for the bulk of the composition and that specific formulations of compositions of the present type most generally possess allowable limits within which the amount of sand may vary without adversely affecting the desired characteristics of the final coat. Most generally if a quantity is utilized which is below the lower limit, the final product will not possess the desired hardness, while if a quantity is utilized which exceeds the maximum allowable limit the final surface product will possess a high degree of brittleness and porosity. The maximum amount of sand which may be advantageously utilized in any specific formulation to enhance the properties of the final surface product is called the optimum sand value, and most generally industry attempts to approach this quantity level in the surface coating products that are produced from their conventional formulations and processes because at this value the specific surface coating product is the most economical. We have found that by utilizing the present novel process not only is this value closely approached, but also the proximity of our sand value to the optimum sand value is closer than any one of a number of conventional processes which have heretofore been utilized.

It has also been found that fillers, in an amount of between about 1% and about 10% by weight based on the total weight of the sand, may be incorporated with the sand charge initially placed in the mold. The fillers which may be utilized are asbestine, calcium carbonate, silica, and the like, however any filling agent which is compatible with the system may be utilized. We have found that although filling agents may be incorporated in system it is a good procedure to keep the filler loading as low as possible because the flow properties which are achieved are not only better for charging and leveling but also the impregnation which is achieved is highly satisfactory. Satisfactory flow properties have been obtained when the filler(s) were present in an amount between about 5% and about 7% by weight based on the total weight of sand used, however optimum results were obtained when about 6% filler(s) were utilized.

The mold containing the sand is vibrated to produce a compact and comparatively denser sand mass. There are many conventional methods of compacting sand in a mold which may be utilized in the present process without departing from the spirit of invention embodied therein. For example, a ram or even a rotary press may pressure compact the sand particles into a more compact or denser shape. We have preferentially utilized a vibrating type system because it has been found that while vibrating the sand mass, the relatively small sand particles gravitationally flow past the comparatively larger particles of the sand system towards the facing floor of the mold. This action results in producing a density gradient throughout the sand mass in which a higher solid concentration is advantageously distributed in the area of the mold's facing floor which will ultimately be the area in close proximity to the exposed visible surface of the final coat when it is applied to a masonry building unit. It has been found that by placement of a comparatively higher percentage of relatively smaller sand particles within the area which is in close proximity to the wearing surface of the final coat, we may achieve a final product whose surface has an enhanced hardness, a greater durability, and a higher abrasion resistance than many of these products which have been heretofore commercially produced. Also, by utilizing the vibrating system we have substantially decreased the void volume of the shaped sand mass to about 24% of the total mass area and therefore the amount of resinous fluid will be necessary to fill these voids is also substantially decreased.

The fluid composition utilized to wet the non-woven web, which is deposited on the upper surface of the shaped sand mass, includes one or more resinous type components and may also include other material such as plasticizers, fillers, pigments, stabilizers and the like. The resinous component which may be utilized in such compositions should be able to be cured by heat, or a combination of heat and pressure, and if this fluid composition includes more than one resinous material then all of the resinous components present in this composition should be able to be cured similarly, i.e., either by heat, or a combination of heat and pressure.

The viscosity of the fluid impregnant in the mold charging stage of the process is most generally dependent upon the viscosity of the plasticizer(s) utilized, the type of resinous component incorporated into the composition, the inherent characteristics of the fluid system, i.e., whether the resinous material is either in the form of a molten mass, a true solution in a solvent, or a dispersion such as a plastisol or organosol, and also upon the type of mold charging equipment which may be used in the present process. Most generally the fluid composition at this stage of the process must have a viscosity of between about 60 and about 2,000 centipoises in order to achieve an adequate resinous impregnation in one operation, however highly satisfactory results have been achieved when the fluid composition utilized in the present process had a viscosity of between about 60 and about 1,000 centipoise.

The plasticizers which are used in the present process may be either volatile or non-volatile, but the preferential plasticizers are of low viscosity, substantially non-volatile, polymerizable materials which will polymerize during the curing stage of the process. There are many type plasticizers which are commercially available and which may be used in the present process, however satisfactory results were obtained when we used a polyester resin commercially available under the tradename of "Paraplex P-43" from the Rohm and Haas Company, which is believed to be a condensation product of propylene glycol and di-propylene glycol in the ratio of between about 1 and about 3 with phthalic anhydride and maleic anhydride in the ratio of between about 3 and about 2.

Also satisfactory results were achieved when a mixture of "Paraplex P-43," and another polyester resin, commercially available under the tradename of "Paraplex P-13" from the Rohm and Haas Company, was utilized. "Paraplex P-13" is believed to be a condensation product of ethylene glycol and diethylene glycol with phthalic anhydride, maleic anhydride, and adipic acid. If it is desired to decrease the viscosity of the fluid resinous mass it may be advantageous to add a fluid resinous monomer of low viscosity to the system to achieve this result.

Other components which may be incorporated into the fluid composition may be either accelerators, catalysts, or pigments, however the choice of each of these components would primarily depend upon their compatibility with the fluid resinous composition including the plasticizer(s).

Although we preferentially describe a non-woven cotton web-like fabric as the reservoir for the aforedescribed fluid composition in the present embodiment, there are a number of other compressible and highly absorptive materials which may be utilized in the present process without departing from the scope of the present invention. For instance, vermiculite which is an expanded mica has been found to give satisfactory results when utilized in the present process. The aforesaid expanded mica is not only absorptive but it also exhibits a compressibility in the area of about 15% by volume. Most generally the absorptive, compressible material may be substantially wet by ordinary and conventional bath process. For example if the absorptive, compressible material is in the form of a web belt it may be passed into and through a bath containing the fluid impregnant by an ordinary roller system, or if it is in the form of agglomerate such as expanded mica it may be wetted by a simple soaking system.

The absorptive, compressible material, which is saturated with the resinous fluid composition, is positioned in place upon the upper surface area of the shaped sand mass. The positioning of this material in relation to the sand mass is such that the exposed area of the sand mass is substantially covered by the absorptive, compressible material. In case of the saturated web it may simply be surmounted on the sand's surface, and in the case of the expanded mica which has been resin saturated, a simple distribution of the agglomerates in a somewhat uniform fashion over the sand surfaces would suffice.

At this point in the process an insert form, of slightly less dimension in width and length as compared to the mold, is surmounted upon the absorptive material. We have found that a clearance of about 1/16 of an inch was quite satisfactory, however the size of the clearance area would most generally depend upon the desired thickness of the sides of the final surface coat product. The surfaces of the insert form which would come in contact with the resinous fluid are preferentially covered with either a tetrafluoroethylene polymer or polyethylene material in order to facilitate an adequate release of the form from the final surface product after the final stage of the process. In general there are a number of appropriate insert forms which may be utilized in the present process. The size and shape of the form which is utilized is generally dependent upon the size and shape of the mold. A light weight metallic insert form is preferred because of its relatively good heat transfer which would aid in distributing the heat somewhat uniformly throughout the coating cap during the curing stage of the process. However, we have even used a block of wood as the insert form in the present process.

At this stage of the process, a force is applied to the upper surface of the inserted form forcing it down upon the surface of the saturated compressible resinous carrier. This compressing force results in the resinous fluid being forced to leave the carrier and to penetrate down into the interstices of the sand mass. The force which is applied to the surface of the insert form should be between about 5,000 pounds and about 10,000 pounds for a period of between about 5 minutes and about 15 minutes.

Further, it may be stated that at this point in the process, a substantial amount of the fluid impregnant is not only in intimate contact with the compressed resin carrier and the upper surface of the shaped sand mass but this fluid also penetrates into the interstitial network of the sand mass occupying the same. This penetration is substantial enough to extend as far down as the facing floor of the mold, contacting the same. Not only are the sand particles of this system now encased by the resinous impregnant, but also there exists a layer of coating composition between the facing floor and the mass of sand. There is some surface adhesion exhibited by this fluid resinous composition which entraps the sand particles at this point of the process, but the strength of this adhesion is not sufficient enough to allow the removal of the shaped mass from the mold in a permanently non-deformable condition. The contents of the mold are now subjected to a curing stage which facilitates the transformation of this fluid composition into a somewhat rigid mass, which increases the strength of the adhesion bond which ultimately holds the sand in its shaped form.

The curing stage incorporated into the present process may be applied to the contents of the mold simultaneously with the pressure impregnation stage, or the curing stage may be applied after the impregnation of the sand mass is substantially complete. Curing of the fluid composition in some cases may be accomplished by heat, or a combination of heat and pressure with the determinant factor being the curing characteristics of the particular resinous composition which is utilized in the process. In illustration, when the polyester type resinous compositions were utilized, a curing temperature of between about 180° F. and 300° F. for a period of between about 5 minutes and about 15 minutes was found to be quite sufficient to transform the fluid composition into a solidified matrix comprising the final surface coating unit. However, it may be further stated that most generally a temperature within the range of between about 125° F. and about 375° F. for a period of between about 1 minute and about 30 minutes may be satisfactorily utilized for a suitable curing cycle.

After the curing cycle is completed the contents of the mold may be allowed to return to room conditions and the solidified matrix, of which the final surface coating unit is composed, is removed from the mold. It has been found that in some cases the coating unit may be removed from the mold while it is hot, but this depends upon the type of resinous binder utilized. However for overall utility it is a better technique to allow the temperature of the system to return to normal before removing the surface coating unit from the mold.

The following examples are by way of illustration of the utilization of the present process in the production of surface coating caps, but these examples are not in any way to be construed as limitations upon the appended claims.

*Example 1*

57 grams of sand were poured into a 4" x 8" x ½" pre-waxed mold and the mold was then manually vibrated to level the sand therein.

50 grams of a polyester resin (available under the tradename of "Paraplex P-43" from the Rohm and Haas Company and thought to be a condensation product of propylene glycol and dipropylene glycol in the ratio of 1 to 3 with phthalic anhydride and maleic anhydride in the ratio of 3 to 2) were mixed with 1.0 gram of methyl ethyl ketone peroxide. Subsequently 0.25 gram of cobalt naphthenate, 0.50 gram of a blue cement pigment, and 10.0 grams of calcium carbonate was further added to the resinous mixture and dispersed therein by stirring.

A 4" x 8" non-woven web fabric was placed on a

6" x 20" polyethylene sheet and 26 grams of the aforesaid mixture was poured over the non-woven web, at which time the surface of the polyethylene which was not covered by the web was folded over the top surface of the web. The folding was such that the folded polyethylene sheet lapped over the top surface of the resinous mass. A rolling pin was applied to the upper fold of the lapped polyethylene sheet resulting in a somewhat even distribution of the resinous material throughout the enclosed web.

The resinous saturated web was now removed from its polyethylene casing and was surmounted in position upon the upper top surface of the sand mass such that the top surface area of the sand mass was substantially covered by the web.

A sheet made of a tetrafluoroethylene polymer was wrapped around a wooden insert block such that one of the 3⅞" x 7⅞" faces, of the 3⅞" x 7⅞" x 3" block, was completely covered. The 3⅞" x 7⅞" face of the block which was superimposed by the polyethylene sheet was now surmounted upon the upper surface of the saturated web and positioned such that the block inserted into the mold.

The mold containing the aforesaid contents was now mounted on a lower platen of a hydraulic platen press and the lower platen was gradually raised until the top surface of the block was in contact with the upper platen at which time compression was continued until a force of about 8,000 pounds was applied to the upper surface of the block.

Steam was applied to the lower platen and its temperature was allowed to rise to and maintained at between about 250° F. and about 280° F. for a period of about 10 minutes.

At the end of the heating cycle the steam was diverted from the lower platen and cool water was supplied thereto for a period of about 3 minutes in order to lower the temperature of the platen to about 100° F. At this point, the lower platen was returned to its normal position in order to release the pressure being applied to the upper surface of the block and the mold was removed therefrom. The insert block and the surface coating cap, which was now integrally bonded to the non-woven web, were removed from the mold and the cap was in condition to be adhered to a masonry building unit.

*Example II*

53 grams of sand were poured into a 4" x 8" x ½" pre-waxed mold and the mold was then manually vibrated to level the sand therein.

50 grams of a polyester resin (available under the tradename of "Paraplex P–43" from the Rohm and Haas Company and thought to be a condensation product of propylene glycol and dipropylene glycol in the ratio of 1 to 3 with phthalic anhydride and maleic anhydride in the ratio of 3 to 2) were mixed with 6.5 grams of another polyester resin (available under the tradename of "Paraplex P–13," believed to be a condensation product of ethylene glycol and diethylene glycol with phthalic anhydride, maleic anhydride and adipic acid) and 1.0 gram of methyl ethyl ketone peroxide. Subsequently 0.25 gram of cobalt naphthenate, 0.50 gram of a blue cement pigment, and 10.0 grams of calcium carbonate was further added to the resinous mixture and dispersed therein by stirring.

A 4" x 8" non-woven cotton web fabric was placed a 6" x 20" polyethylene sheet and 26 grams of the aforesaid admixture was poured over the non-woven web, at which time the surface of the polyethylene which was not covered by the web was folded over the top surface of the web. The folding was such that the folded polyethylene sheet lapped over the top surface of the resinous mass. A rolling pin was applied to the upper fold of the lapped polyethylene sheet resulting in a somewhat even distribution of the resinous material throughout the enclosed web.

The resinous saturated web was now removed from its polyethylene casing and was surmounted in position upon the upper surface of the sand mass so that the top surface area of the sand was substantially covered by the web.

A sheet made of a tetrafluoroethylene polymer was wrapped around a wooden insert block such that one of the 3⅞" x 7⅞" faces, of the 3⅞" x 7⅞" x 3" block was completely covered. The 3⅞" x 7⅞" face of the block which was superimposed by the polymer sheet was now surmounted upon the upper surface of the saturated web and positioned so that the block could be inserted into the mold.

The mold containing the aforesaid contents was now mounted on a lower platen of a hydraulic platen press and the lower platen was gradually raised until the top surface of the block was in contact with the upper platen at which time compression was continued until a force of about 8,000 pounds was applied to the upper surface of the block.

Steam was applied to the lower platen and its temperature was allowed to rise to and maintain at about 250° F. for a period of about 10 minutes.

At the end of the heating cycle the steam was diverted from the lower platen and cool water was supplied thereto for a period of about 3 minutes in order to lower the temperature of the platen to about 100° F. At this point, the lower platen was returned to its normal position in order to release the pressure being applied to the upper surface of the block and the mold was removed therefrom. The insert block and the surface coating cap, which was now integrally bonded to the non-woven web, were removed from the mold and the cap was in condition to be adhered to a masonry building unit.

*Example III*

A mixture of 50 grams of sand and 2.5 grams of asbestine was poured into a 4" x 8" x ½" pre-waxed mold and the mold was then manually vibrated to level the sand therein.

50 grams of a polyester resin (available under the tradename of "Paraplex P–43" from Rohm and Haas Company and thought to be a condensation product of propylene glycol and dipropylene glycol in the ratio of 1 to 3 with phthalic anhydride and maleic anhydride in the ratio of 3 to 2) were mixed with 1.0 gram of methyl ethyl ketone peroxide. Subsequently 0.25 gram of cobalt naphthenate, 0.50 gram of a blue cement pigment, and 10.0 grams of calcium carbonate was further added to the resinous admixture and dispersed therein by stirring.

A 4" x 8" non-woven cotton fabric was placed on a 6" x 20" polyethylene sheet and 26 grams of the aforesaid mixture was poured over the non-woven web, at which time the surface of the polyethylene which was not covered by the web was folded over the top surface of the web. The folding was such that the folded polyethylene sheet lapped over the top surface of the resinous mass. A rolling pin was applied to the upper fold of the lapped polyethylene sheet resulting in a somewhat even distribution of the resinous material throughout the enclosed web.

The resinous saturated web was now removed from its polyethylene casing and surmounted in position upon the upper surface of the sand mass so that the top surface area of the sand mass was substantially covered by the web.

A sheet made of a tetrafluoroethylene polymer was wrapped around a wooden insert block such that one of the large faces of the 3⅞" x 7⅞" x 3" block was completely covered. The 3⅞" x 7⅞" face of the block which was superimposed by the polyethylene sheet was now surmounted upon the upper surface of the saturated web and positioned so that the block inserted into the mold.

The mold containing the aforesaid contents was now mounted on a lower platen of a hydraulic platen press and the lower platen was gradually raised until the top surface of the block was in contact with the upper platen at which time compression was continued until a force of about 8,000 pounds was applied to the upper surface of the block.

Steam was applied to the lower platen and its temperature was allowed to rise to and maintained at between about 250° F. and about 280° F. for a period of about 10 minutes.

At the end of the heating cycle the steam was diverted from the lower platen and cool water was supplied thereto for a period of about 3 minutes in order to lower the temperature of the platen to about 100° F. At this point, the lower platen was returned to its normal position in order to release the pressure being applied to the upper surface of the block and the mold was removed therefrom. The insert block and the surface coating cap, which was now integrally bonded to the non-woven web were removed from the mold and the cap was in condition to be adhered to a masonry building unit.

*Example IV*

A mixture of 50 grams of sand and 2.5 grams of asbestine was poured into a 4" x 8" x ½" pre-waxed mold and the mold was then manually vibrated to level the sand therein.

50 grams of a polyester resin (available under the tradename of "Paraplex P-43" from the Rohm and Haas Company and thought to be a condensation product of propylene glycol and dipropylene glycol in the ratio of 1 to 3 with phthalic anhydride and maleic anhydride in the ratio of 3 to 2) were mixed with 1.0 gram of methyl ethyl ketone peroxide. Subsequently 0.25 gram of cobalt naphthenate, 0.05 gram of a blue cement pigment, and 10.0 grams of calcium carbonate was further added to the resinous admixture and dispersed therein by stirring.

15 grams of the aforesaid resinous mixture were poured into a mixing cup and 90 cc. of expanded vermiculite mica was added thereto with stirring until all of the resin was substantially absorbed into the vermiculite. At this point in the process, the saturated vermiculite was spread in a somewhat even layer over the top of the sand in the mold.

A sheet made of a tetrafluoroethylene polymer was wrapped around a wooden insert block so that one of the large faces of the 3⅞" x 7⅞" x 3" block was completely covered. The 3¹⁵⁄₁₆" x 7¹⁵⁄₁₆" face of the block which was superimposed by the polyethylene sheet was now surmounted upon the upper surface of the saturated vermiculite and positioned so that the block inserted into the mold.

The mold containing the aforesaid contents was now mounted on a lower platen of a hydraulic platen press and the lower platen was gradually raised until the top surface of the block was in contact with the upper platen at which time compression was continued until a force of about 8,000 pounds was applied to the upper surface of the block.

Steam was applied to the lower platen and its temperature was allowed to rise to and maintained at between about 250° F. and about 280° F. for a period of about 10 minutes.

At the end of the heating cycle the steam was diverted from the lower platen and cool water was supplied thereto for a period of about 3 minutes in order to lower the temperature of the platen to about 100° F. At this point, the lower platen was returned to its normal position in order to release the pressure being applied to the upper surface of the block and the mold was removed therefrom. The insert block and the surface coating cap, which was now integrally bonded to the non-woven web was removed from the mold and was in condition to be adhered to a masonry building unit.

It will be apparent to those in the art that the aforesaid descriptive material including the examples may be varied without departing from the spirit of invention embodied in such process. In illustration, an important variation of the present process which is adaptable to the mold charging stage of the process consists in directly depositing a fluid resinous coating composition upon the upper surface of the shaped sand mass without the use of an absorptive reservoir, surmounting an insert form upon such fluid surface and pressure impregnating such fluid substantially into the interstitial network of the shaped sand mass by applying pressure between about 150 pounds per square inch and about 310 pounds per square inch to the upper surface of the insert form. Subsequently such fluid is transformed into a solidified matrix making up the final coating cap product.

Further, although the aforesaid modifications of the present process are described in the production of surface coating caps, it is not limited to such, but may be utilized to produce a surface coat which is integrally bonded to masonry building units. In illustration, if a masonry building unit is utilized as the insert form it will be found that following the pressure impregnation and curing stage of the process the shaped surface coating composition will be integrally bonded to the building unit. Of course, it is to be noted that the surfaces of such building unit are not to be coated with release material. It has also been found that in this modification the pressure utilized in impregnating the sand mass also functions to insure an intimate contact between the resinous fluid and the surmounting face of the building unit which aids in facilitating the production of a strong bond between the masonry building unit and the coating composition after the curing stage of the process.

Still another modification of the present process may comprise the steps of depositing a layer of sand into an appropriate size and shape mold, vibrating such mold to not only increase the density of the mass but also to aid the sand mass in taking on the shape of the mold. Subsequently a resinous material is spray coated upon the surface of such sand mass. At this point, another layer of sand is deposited upon the surface of the resinous material in the mold, followed by the spraying of another upon the upper surface of this sand layer. Subsequently, a ram is inserted into the mold and a pressure of between about 50 pounds per square inch and 300 pounds per square inch is applied to such ram for a period of between about 5 and about 50 minutes while the system is maintained at a temperature between about 170° F. and about 350° F. At the end of this heating and pressure cycle it has been found that a homogeneous structure results which may be utilized as a surface coat cap for an appropriate size building unit.

A further modification of the present process may be illustrated by the following example in which, a resinous material is deposited in an even layer upon the lower surface of a pressure ram, and the ram is inserted into an appropriate size pre-heated mold whose lower facing surface is substantially covered with sand. The resinous material utilized not only exhibits a relatively lower melting point under agitation as compared with the melting point exhibited by the same material when no agitation is applied thereto, but also such resin may be recrystallized by merely cooling it, and exhibits some degree of thixotropy. Further, this resinous material may be substantially cured by application of heat in the range somewhat above its non-agitated melting point.

The inserted ram is brought down until the resin, deposited on the ram's pressing surface, is contacted with the upper surface of the heated sand mass. When the resin contacts this heated sand mass it will melt and will be rapidly absorbed into such sand mass. Simultaneously, with this heating stage, pressure is applied to such ram to aid in forcing the resinous material into the interstices of said sand mass as heretofore described. After the resinous material has substantially coated the particles of the heated sand mass, the temperature of the system is raised and the resinous material is substantially cured therein. However, if the temperature of the sand mass is above the temperature of cure of the resin no added heat would be required.

*Example 5*

50 grams of sand were poured into a 4" x 8" x ½" pre-waxed mold and the mold was then manually vibrated to increase the density of such sand mass, and to allow the same to take on the shape of the mold. The mold and its contents were heated until the sand mass was at a temperature above about 120° F.

At this stage of the process, 100 grams of a styrene thixotropic resin, commercially available under the tradename of "Selection 5404" from the Pittsburgh Plate Glass Company, 1.5 grams of benzoyl peroxide catalyst, and 0.05 gram of cobalt naphthenate were deposited into a 100 ml. beaker and such a beaker was placed in position in a water bath. The water bath consisted of a 500 ml. beaker surmounted upon the heating surface of an electrically heated hot-plate. The water bath was heated until the temperature of the viscous mass was raised to about 120° F. During this heating operation the viscous mixture contained in the 100 ml. beaker was stirred until the mass was somewhat homogeneous. Subsequently to this aforesaid operation about 25 grams of this viscous mass was applied to the lower surface of a plunger type pressure ram and the mass was then screeded level with a flat edge tool.

At this point the mold containing the heated sand was placed in position upon the lower platen of a M. and N. hydraulic platen press and the resinous covered surface of the pressure ram was inserted into the 4" x 8" mold. The positioning of the ram was such that there existed a 1/16 inch clearance between the sides of the mold and the respective sides of the ram. The ram was slowly being forced into the mold by the action of the lower platen, until the lower surface of the resinous mass contacted the upper surface of the heated sand mass, at which point, the resinous mass began to melt and was drawn into the interstices of the sand mass by capillary action. The downward movement of the ram was continued until a substantial amount of the resin was absorbed by the sand mass.

The lower platen of the hydraulic press continued to move up until a force of about 8,000 pounds was applied to the upper surface of the pressure ram. During this pressure stage, contents of the mold had achieved a temperature of about 300° F., which temperature was maintained until the resinous mass had substantially cured.

The lower platen was now lowered and it was found that the coating cap unit produced by this aforesaid process was in condition to be adhered to an appropriate sized masonry building unit.

In the above described example we have utilized a styrene type resinous material, however, there are a number of other resinous compositions which may be utilized if they exhibit the properties which are aforedescribed. Also it may be stated that the pressure and temperature of the present process may be somewhat varied with the determining factor being the specific resin utilized in the process.

I claim:

In a process for forming a decorative sand-filled resinous coating on a masonry building block, the improvement comprising: placing sand in a mold having the shape of said coating; vibrating said mold to compact said sand; surmounting said sand with an absorptive, compressible material selected from the group consisting of (1) a nonwoven cotton fabric and (2) expanded mica, said material containing a liquid heat-convertible resin; surmounting said absorptive, compressible material with a masonry building block; applying a downward pressure between 150 and 310 pounds per square inch to said masonry building block to express said resin from said absorptive, compressible material and to shape said material and said resin in said mold; and heating said mold to a temperature between 180° F. and 250° F. for a period of 5 to 10 minutes to solidify said liquid resin in said mold, said absorptive, compressible material being embedded in said solidified resin during said heating stage and said coating being firmly attached to said masonry building block.

References Cited in the file of this patent

UNITED STATES PATENTS

| | | |
|---|---|---|
| 1,684,525 | Tomarin | Sept. 18, 1928 |
| 2,018,192 | Sexton | Oct. 22, 1935 |
| 2,301,951 | Isman | Nov. 17, 1942 |
| 2,456,093 | Swedlow | Dec. 14, 1948 |
| 2,495,640 | Muskat | Jan. 24, 1950 |
| 2,629,135 | Johnson | Feb. 24, 1953 |
| 2,667,664 | Ferrell | Feb. 2, 1954 |
| 2,751,626 | Lyijynen et al. | June 26, 1956 |
| 2,751,775 | Sergovic | June 26, 1956 |
| 2,752,275 | Raskin et al. | June 26, 1956 |
| 2,805,448 | Rubenstein | Sept. 10, 1957 |